(12) United States Patent
Mohtashemi et al.

(10) Patent No.: US 7,872,546 B1
(45) Date of Patent: Jan. 18, 2011

(54) MULTI MODE MODULATOR AND METHOD WITH IMPROVED DYNAMIC LOAD REGULATION

(75) Inventors: Behzad Mohtashemi, Los Gatos, CA (US); Allan Chang, Fremont, CA (US)

(73) Assignee: Alpha and Omega Semiconductor Incorporated, Sunnyvale, CA (US)

( * ) Notice: Subject to any disclaimer, the term of this patent is extended or adjusted under 35 U.S.C. 154(b) by 62 days.

(21) Appl. No.: 12/498,566

(22) Filed: Jul. 7, 2009

(51) Int. Cl.
*H02M 3/335* (2006.01)
*H03K 7/06* (2006.01)
*H03K 7/08* (2006.01)
*H03K 7/10* (2006.01)

(52) U.S. Cl. .................. 332/108; 332/109; 332/112; 363/25; 363/26

(58) Field of Classification Search ......... 332/106–116; 327/172, 175; 363/21.01, 21.11, 24–26, 363/41
See application file for complete search history.

(56) References Cited

U.S. PATENT DOCUMENTS

2010/0231190 A1* 9/2010 Falvey et al. ................ 323/284

* cited by examiner

*Primary Examiner*—David Mis
(74) *Attorney, Agent, or Firm*—Chein-Hwa Tsao; CHEmily LLC

(57) ABSTRACT

A dual mode modulator is proposed for driving a power output stage having a serial connection of high-side power FET and low-side power FET. The dual mode modulator includes a PWM modulator operating under a PWM-frequency and a PFM modulator for controlling the power output stage. To improve the dynamic load regulation of the dual mode modulator, a dynamic frequency booster can be added to the dual mode modulator to boost up the PWM-frequency from its normal operating frequency during a PFM-to-PWM mode transition period. Secondly, a dynamic slew rate booster can be added to boost up an error amplifier slew rate of the PWM modulator from its normal operating slew rate during the mode transition period. Thirdly, a dynamic turn-off logic circuit can be added to turn off the low-side power FET during the mode transition period.

15 Claims, 7 Drawing Sheets

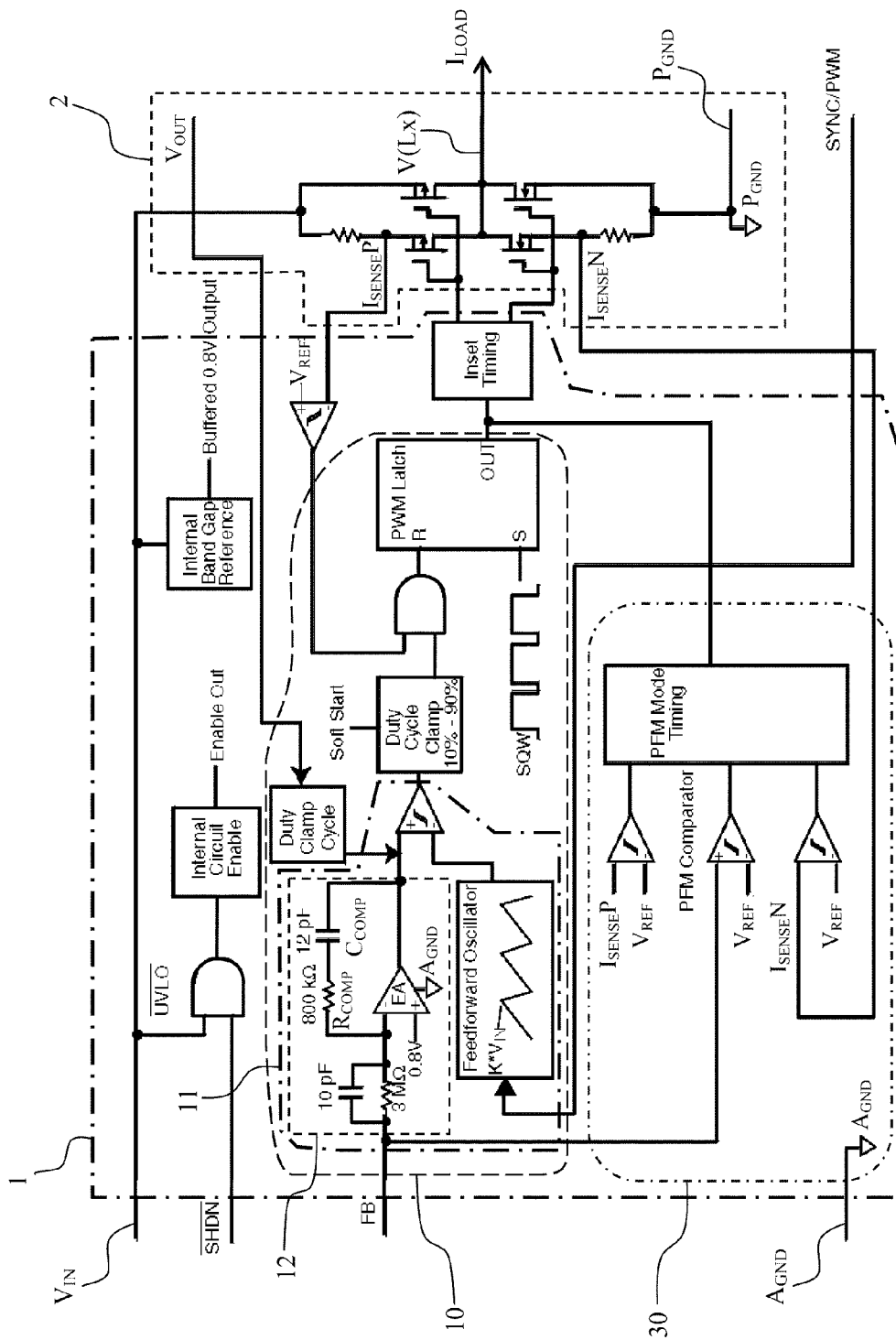
Fig. A1 Prior Art

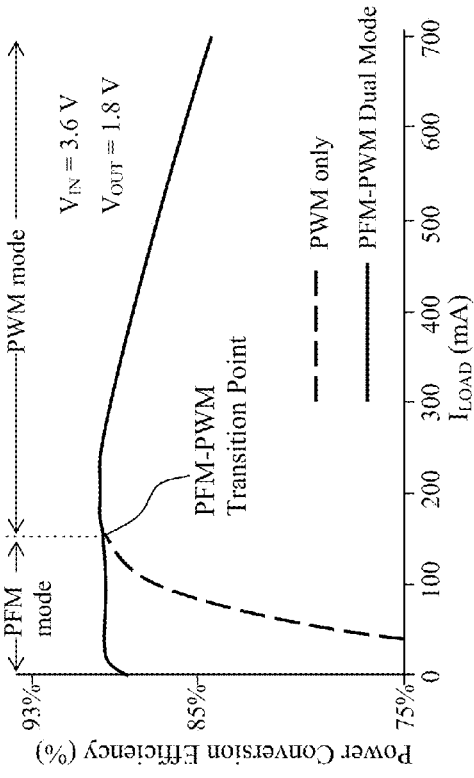
Fig. A4 Prior Art
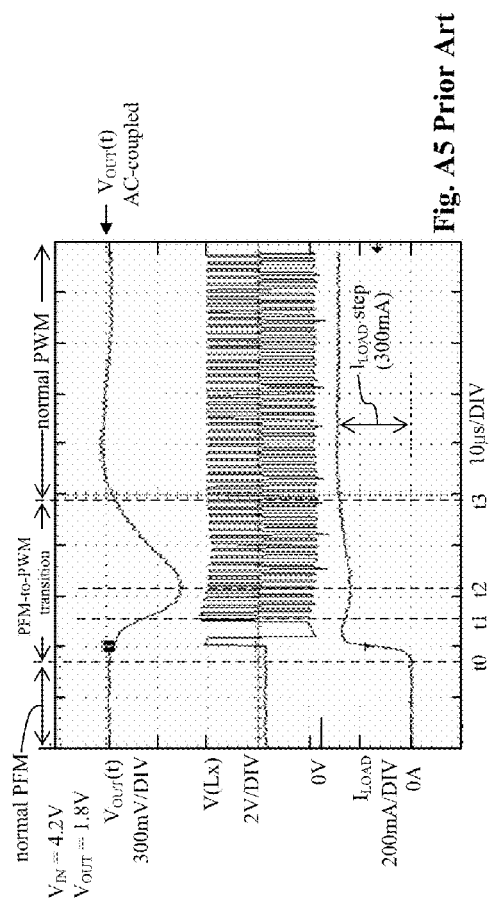
Fig. A5 Prior Art
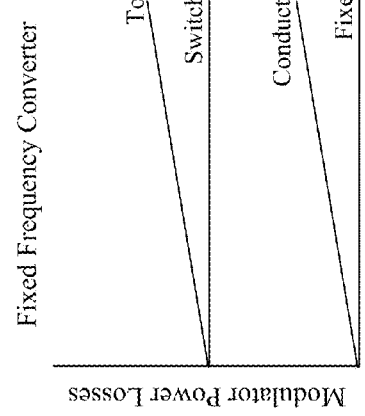
Fig. A2
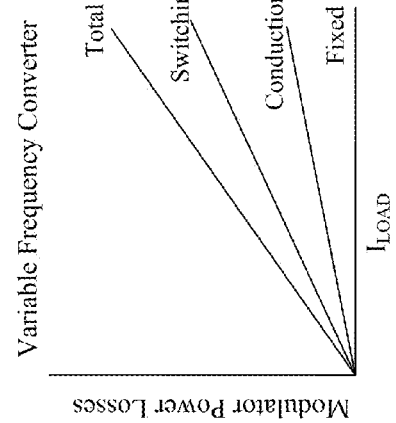
Fig. A3

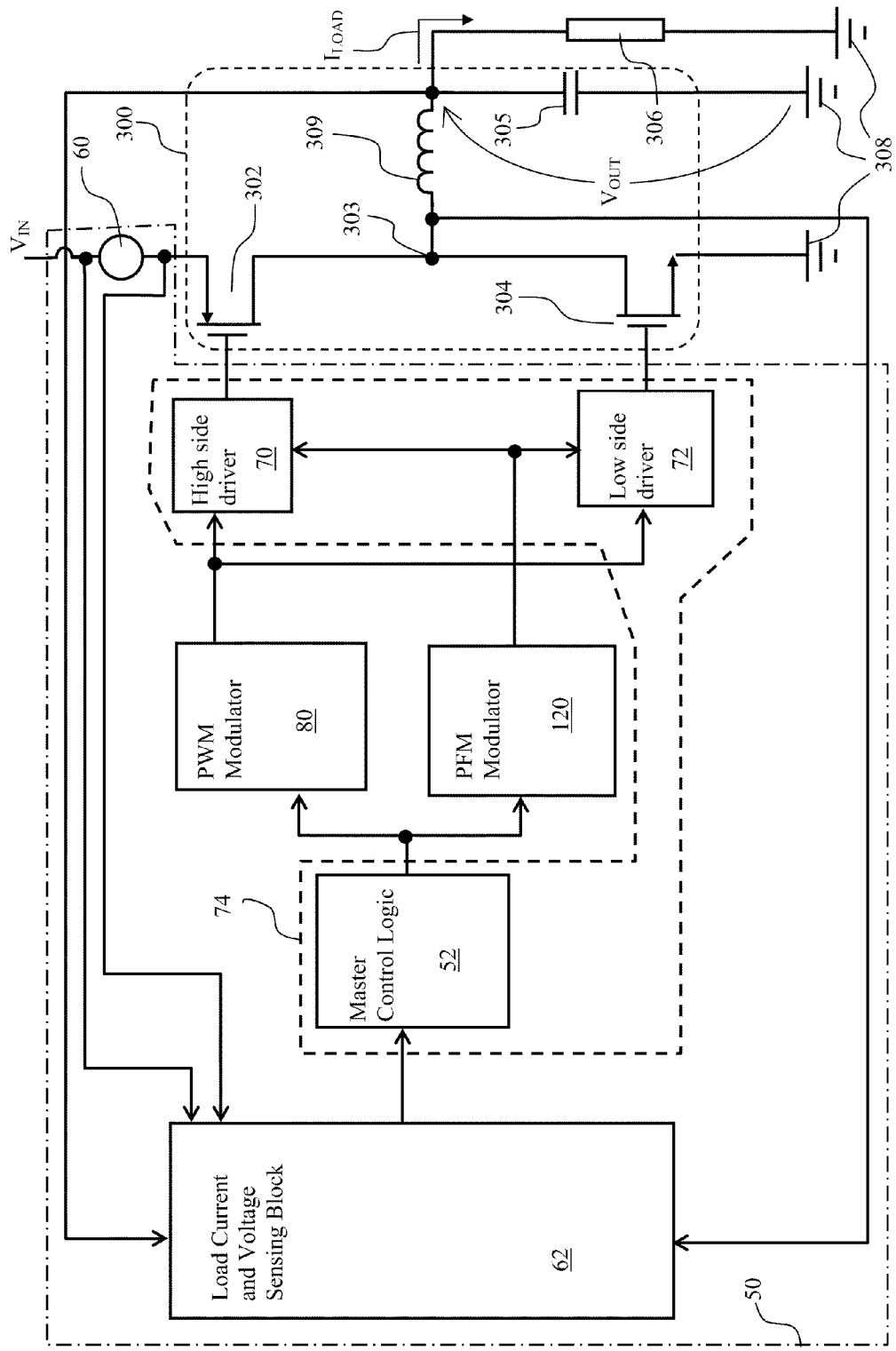
Fig. 1 Present Invention

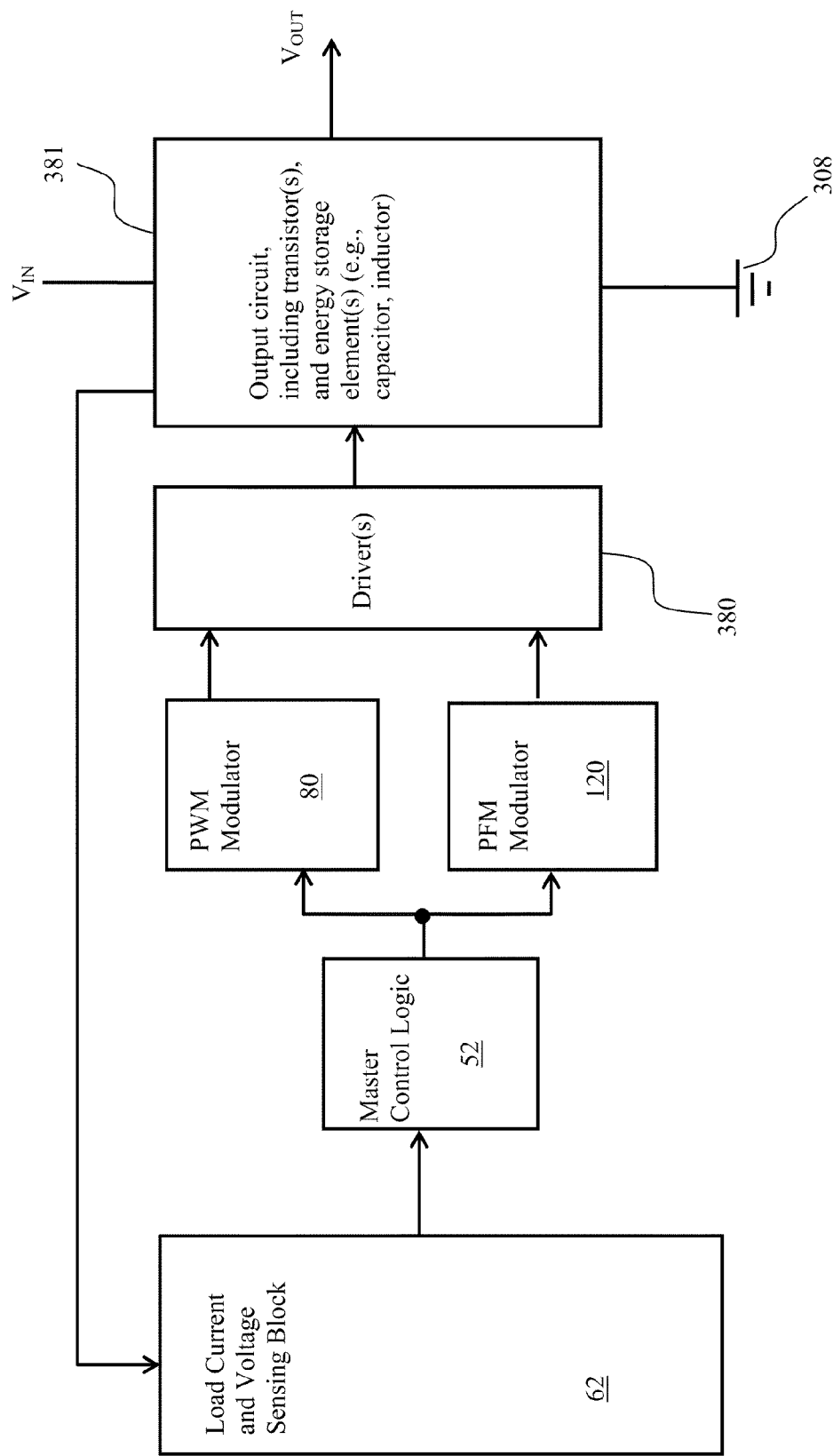
Fig. 1A Present Invention

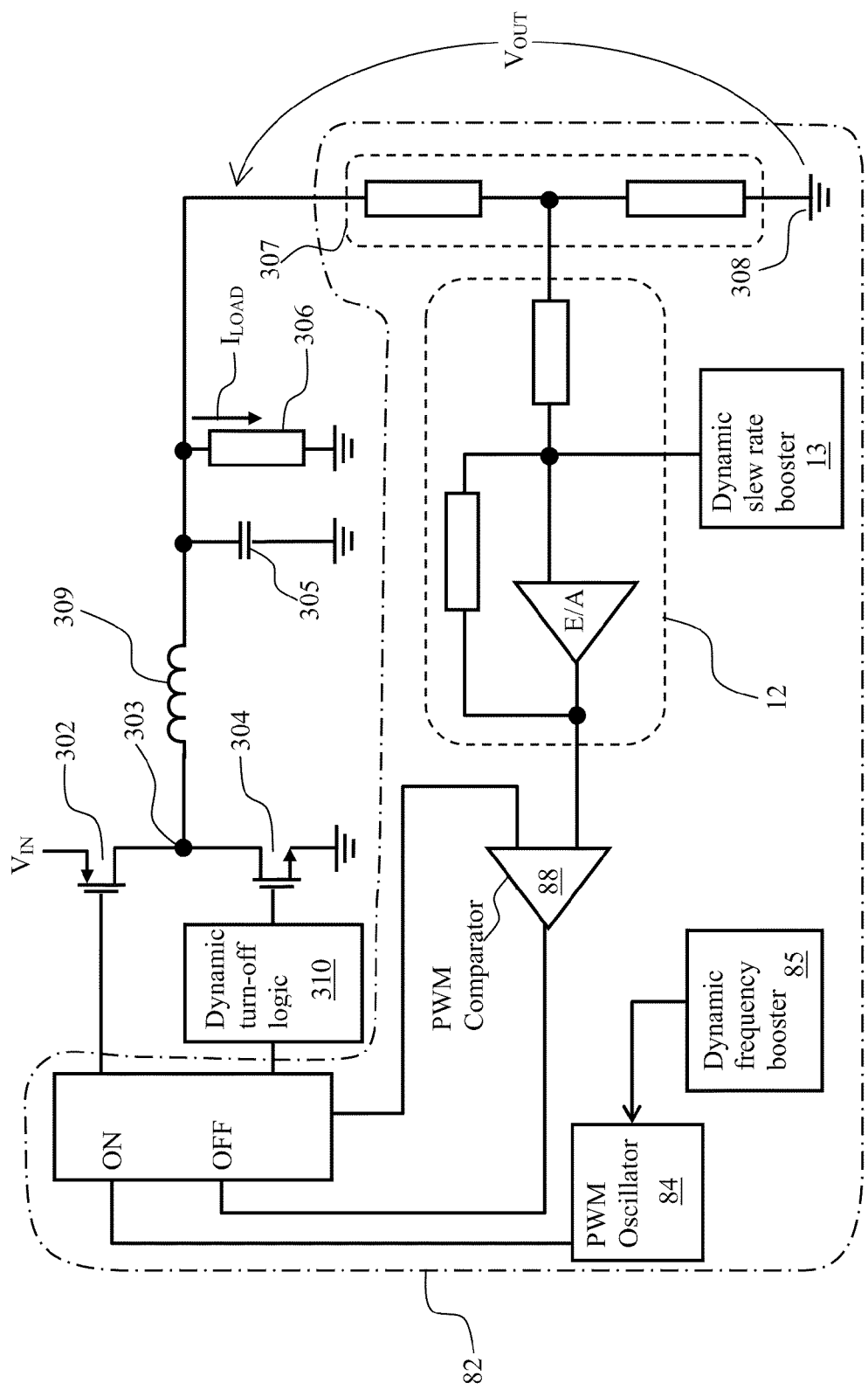
Fig. 2 Present Invention

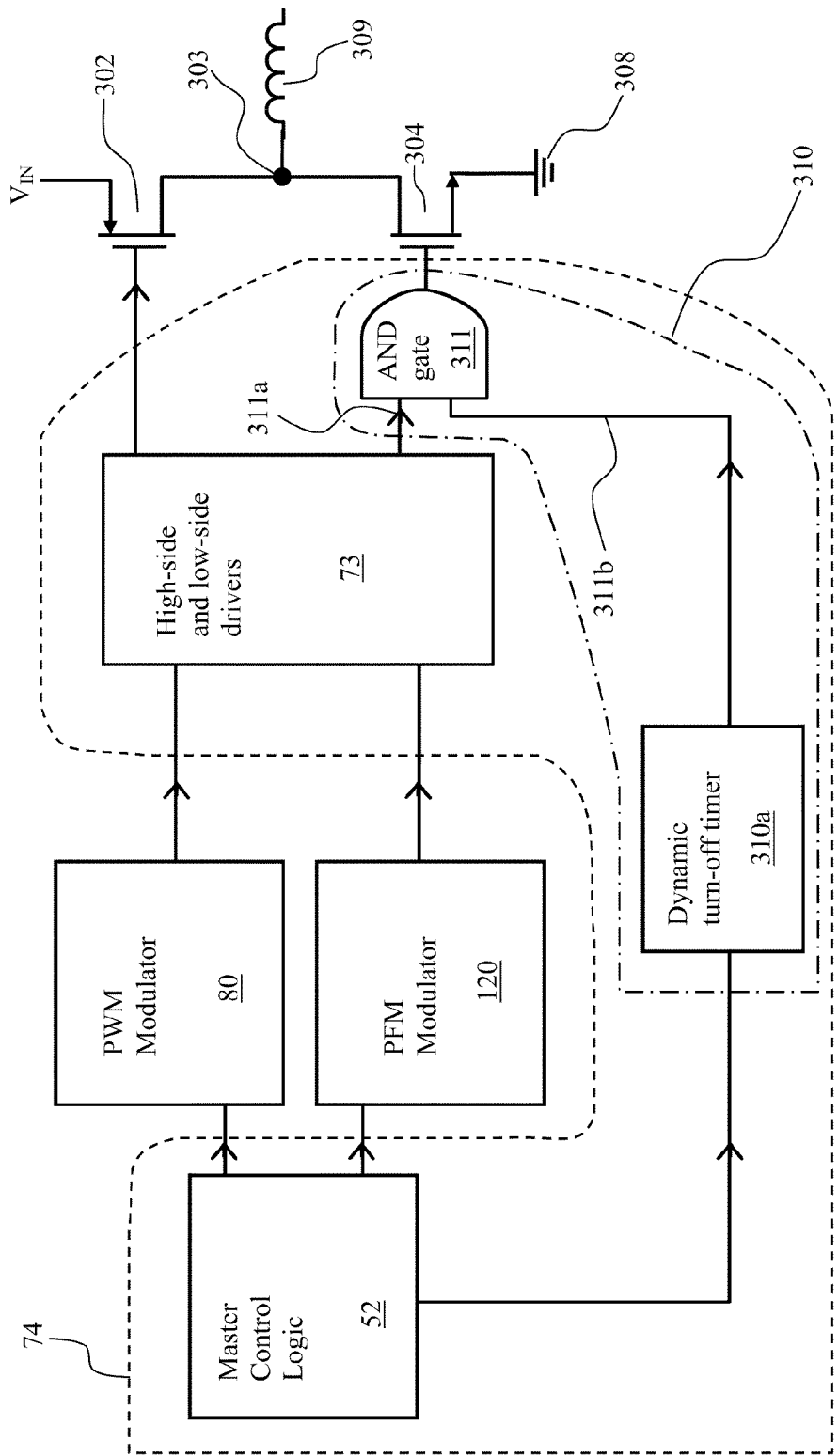
Fig. 3 Present Invention

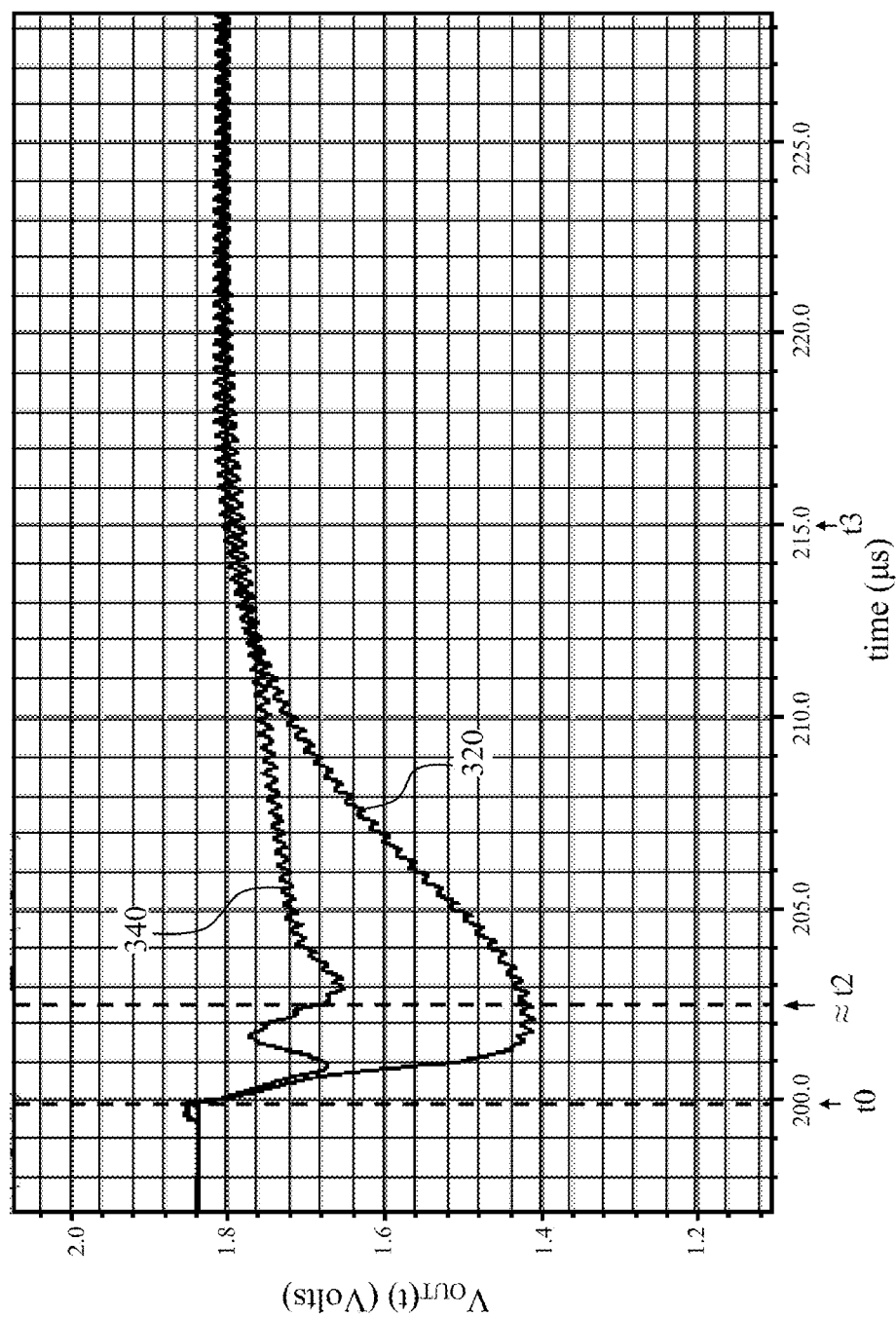
Fig. 4 Comparison of Prior Art and Present Invention

MULTI MODE MODULATOR AND METHOD WITH IMPROVED DYNAMIC LOAD REGULATION

FIELD OF INVENTION

This invention relates generally to the field of electrical circuit. More specifically, the present invention is directed to the system design of a power converter.

BACKGROUND OF THE INVENTION

Power converters form the ubiquitous base of most electrical products and systems. A fundamental requirement of the power converter is high power conversion efficiency, measured as the division of output power by input power.

FIG. A1, FIG. A4 and FIG. A5 illustrate a prior art pulse width modulation (PWM)-pulse frequency modulation (PFM) dual mode modulator 1 together with some of its performance characteristics like power conversion efficiency (FIG. A4) and dynamic load regulation following a large step increase of its load current (FIG. A5). The prior art PWM-PFM dual mode modulator 1 converts power from an unregulated supply voltage $V_{IN}$ then delivers, through a power output stage 2, a regulated output voltage $V_{OUT}$ with a load current $I_{LOAD}$ through an external LOAD (not shown) to a power ground $P_{GND}$. The power output stage 2 has a number of high-side and low-side switching power transistors, joined at a switching voltage node V(Lx), to deliver the required load current $I_{LOAD}$ at the output voltage $V_{OUT}$. The power output stage 2 also senses and provides the output voltage $V_{OUT}$ and the load current $I_{LOAD}$ to the prior art PWM-PFM dual mode modulator 1 to enable its proper regulation of the output voltage $V_{OUT}$.

Notice that the prior art PWM-PFM dual mode modulator 1 can selectively activate a PFM modulator 30 or a PWM modulator 10 to effect the output voltage regulation. While the internal details of both the PFM modulator 30 and the PWM modulator 10 are known to those skilled in the art, it is nevertheless worthwhile to point out that the PWM modulator 10 has a PWM-feedback control loop 11 with an error amplifier (E/A) circuit 12 in it. As a result, the PWM-loop response speed tracks the slew rate of the E/A.

Turning now to FIG. A2 and FIG. A3 that respectively depicts the internal power loss vs. load current $I_{LOAD}$ characteristics of a fixed frequency converter and a variable frequency converter. As examples, the PWM modulator 10 is a fixed frequency converter while the PFM modulator 30 is a variable frequency converter. The total internal modulator power loss has three components: switching loss, conduction loss and fixed loss. In a fixed frequency converter the switching loss stays constant with $I_{LOAD}$ while the switching loss in a variable frequency converter is proportional to $I_{LOAD}$. For both types of converters the conduction loss and the fixed loss are about the same with the conduction loss being proportional to the $I_{LOAD}$ while the fixed loss is insignificant in these examples. As a result, under the condition of increasingly high $I_{LOAD}$ the modulator power loss of a PWM modulator becomes increasingly less than that of a PFM modulator while under diminishingly low $I_{LOAD}$ the opposite is true. Therefore, as illustrated with an example in FIG. A4, under low $I_{LOAD}$ (e.g., when a laptop is on standby) the prior art PWM-PFM dual mode modulator 1 would power its PFM modulator 30 to drive the power output stage 2 in a PFM mode while leaving its PWM modulator 10 in a power off state to save energy. On the other hand, under high $I_{LOAD}$ the prior art PWM-PFM dual mode modulator 1 would power its PWM modulator 10 instead to drive the power output stage 2 in a PWM mode while leaving its PFM modulator 30 in a power off state to save energy. In this way, the prior art PWM-PFM dual mode modulator 1 would achieve a high power conversion efficiency throughout the range of $I_{LOAD}$ (solid curve of FIG. A4). In addition, PWM is a popular standard and many applications are designed to operate in the PWM mode. However, if the prior art PWM-PFM dual mode modulator 1 were to always operate in a PWM mode throughout the range of $I_{LOAD}$, it would suffer from increasingly lower power conversion efficiency below an $I_{LOAD}$~160 mA (dashed curve of FIG. A4).

As another performance characteristic of the prior art PWM-PFM dual mode modulator 1, FIG. A5 shows an example of its dynamic load regulation following a large step increase of its $I_{LOAD}$ (0-300 mA at time $t_0$). Prior to time $t_0$ the prior art PWM-PFM dual mode modulator 1 has been operating under a normal PFM mode. Between time $t_0$ and time $t_3$ the prior art PWM-PFM dual mode modulator 1 has to quickly power off its PFM modulator 30, power on then start up its PWM modulator 10 till it settles in a normal PWM mode again at time $t_3$. As the PWM modulator 10 needs time to power on and start up its operation (see the V(Lx) vs. time plot through $t_0$, $t_1$ and $t_2$), the output voltage $V_{OUT}(t)$ has meanwhile suffered from a substantial transient dip of as much as ~300 mV at time $t_2$ from its normal regulated level of 1.8 V. While this $V_{OUT}(t)$ dip only lasts for about 30 microseconds it may not be acceptable to many sensitive electronic devices powered by it. Therefore, there exists a need to substantially improve the dynamic load regulation of a prior art PWM-PFM dual mode modulator 1 by reducing the $V_{OUT}(t)$ dip and shortening its PFM-to-PWM mode transition period.

SUMMARY OF THE INVENTION

A multi mode modulator is proposed for controlling a power output stage. The power output stage has a high-side power FET serially connected to a low-side power FET at a power output node in turn connected to ground through an output capacitor COUT. While the high-side power FET and the low-side power FET are driven respectively by the multi mode modulator, they develop an output voltage $V_{OUT}$ across an external LOAD and ground with a load current ILOAD. The multi mode modulator includes:

A PWM modulator operating under a PWM-frequency for controlling the power output stage under a PWM mode. The PWM modulator has a PWM-feedback control loop having an error amplifier (E/A) with the PWM-loop response speed tracking the slew rate of the E/A.

At least one non-pulse width modulation (NPWM) modulators for controlling the power output stage under a mode other than the PWM mode.

A mode selector coupled to the PWM modulator and the NPWM modulators. When it is desirable to operate under the PWM mode, the mode selector powers the PWM modulator while leaving the NPWM modulators in a power off state. When it is desirable to operate under the NPWM mode, the mode selector powers the NPWM modulators while leaving the PWM modulator in a power off state. To improve the dynamic load regulation of the multi mode modulator, the mode selector includes at least one of the following mechanisms for shortening its NPWM-to-PWM mode transition period till normal PWM operation:

A. A dynamic frequency booster for boosting up the PWM-frequency from its normal operating frequency during the NPWM-to-PWM mode transition period.

B. A dynamic slew rate booster for boosting up the E/A slew rate from its normal operating slew rate during the NPWM-to-PWM mode transition period.

C. A dynamic turn-off logic circuit for turning off the low-side power FET for a pre-determined low-side turn-off interval within the NPWM-to-PWM mode transition period such that COUT can only be functionally discharged through the LOAD but not unintentionally discharged through the low-side power FET.

In a more specific embodiment, the mode selector further sets the low-side turn-off interval within a range having a maximum about equal to the period of PWM-frequency boosting.

In another more specific embodiment, the mode selector further sets the low-side turn-off interval within a range having a maximum about equal to the period of E/A slew rate boosting.

In a more specific embodiment, the NPWM is selected for delivering low output power through the power output stage. In a particular example, the NPWM is a pulse frequency mode (PFM) modulator.

These aspects of the present invention and their numerous embodiments are further made apparent, in the remainder of the present description, to those of ordinary skill in the art.

BRIEF DESCRIPTION OF THE DRAWINGS

In order to more fully describe numerous embodiments of the present invention, reference is made to the accompanying drawings. However, these drawings are not to be considered limitations in the scope of the invention, but are merely illustrative.

FIG. A1 is a circuit schematic illustration of a prior art dual mode modulator; performance characteristics like power conversion efficiency (FIG. A4);

FIG. A2 depicts the internal power loss vs. load current characteristics of a fixed frequency converter;

FIG. A3 depicts the internal power loss vs. load current characteristics of a variable frequency converter;

FIG. A4 illustrates the power conversion efficiency vs. load current characteristics of an example prior art PWM-PFM dual mode modulator as the load current statically sweeps through its full operation range;

FIG. A5 depicts the dynamic load regulation of an example prior art PWM-PFM dual mode modulator following a large step increase of its load current;

FIG. 1 together with FIG. 2 are block diagram illustrations of the present invention dual mode modulator;

FIG. 1A shows a conceptually more generalized version of the block diagram of FIG. 1;

FIG. 3 is a more detailed block diagram illustration of a dynamic turn-off logic circuit under the present invention; and FIG. 4 compares the dynamic load regulation between an example prior art PWM-PFM dual mode modulator and the present invention dual mode modulator.

DETAILED DESCRIPTION OF SPECIFIC EMBODIMENTS

The description above and below plus the drawings contained herein merely focus on one or more currently preferred embodiments of the present invention and also describe some exemplary optional features and/or alternative embodiments. The description and drawings are presented for the purpose of illustration and, as such, are not limitations of the present invention. Thus, those of ordinary skill in the art would readily recognize variations, modifications, and alternatives. Such variations, modifications and alternatives should be understood to be also within the scope of the present invention.

FIG. 1 together with FIG. 2 are block diagram illustrations of the present invention dual mode modulator 50 for controlling a power output stage 300. As many circuit schematic details of the dual mode modulator 50 are similar to those of the prior art PWM-PFM dual mode modulator 1 and expected to be clear to those skilled in the art, these circuit schematic details of the dual mode modulator 50 are not shown here to avoid unnecessary obscuring details.

The power output stage 300 is powered by a supply voltage $V_{IN}$ and has a high-side power FET 302 serially connected to a low-side power FET 304 at a power output node 303. The power output node 303 is in turn connected to ground 308 through an inductor 309 and an output capacitor COUT 305. Being both driven by the dual mode modulator 50, the high-side power FET 302 and low-side power FET 304 develop an output voltage VOUT across an external LOAD 306 with a load current ILOAD. A VOUT-sensing network 307 is connected across LOAD 306 for producing a signal proportional to VOUT.

The dual mode modulator 50 includes a PWM modulator 80 operating under a PWM-frequency for controlling the power output stage 300 under a PWM mode. The PWM modulator 80 has a PWM-feedback control loop 82. The PWM-feedback control loop 82 has a PWM oscillator 84, a PWM comparator 88 and an error amplifier (E/A) circuit 12 (referencing the VOUT-sensing network 307) for, under a PWM control mode, controllably switching the power output stage 300 to regulate the VOUT near a pre-determined level. The dual mode modulator 50 also includes a PFM modulator 120 operating under a variable PFM-frequency for controlling the power output stage 300 under a PFM mode. The dual mode modulator 50 further includes a load current and voltage sensing block 62 and a mode selector 74. The load current and voltage sensing block 62 senses, via a connection to the power output node 303 and a current sensing element 60, the final ILOAD and VOUT developed by the power output stage 300. The mode selector 74 includes a master control logic 52 to selectively power the PWM modulator 80 or the PFM modulator 120 according to the output from the load current and voltage sensing block 62. The mode selector 74 also includes a high-side driver 70 and a low-side driver 72 for driving the power output stage 300.

When the master control logic 52 decides to power the PWM modulator 80, it will leave the PFM modulator 120 in a power off state to save energy and to avoid overlapping signals. Likewise, when the master control logic 52 decides to power the PFM modulator 120, it will leave the PWM modulator 80 in a power off state to save energy and to avoid overlapping signals.

To improve the dynamic load regulation of a dual mode modulator, numerous mechanisms can be added to the mode selector 74 to shorten its PFM-to-PWM mode transition period till normal PWM operation and these are illustrated in FIG. 2. Though the output circuit shown here is a synchronous buck converter, these mechanisms can be applied to any other circuit including buck, boost, buck-boost, flyback, half and full bridge, and synchronous or non-synchronous circuits. FIG. 1A shows a conceptually more generalized version of the block diagram of FIG. 1 in which the PWM/PFM oscillators 80, 120 are connected to driver(s) 380 general output circuit 381, which includes transistor(s) and energy storage element(s) (e.g., capacitor, inductor), and has an input voltage $V_{IN}$ and an output voltage $V_{OUT}$. As mentioned above, the output circuit 381 can be a buck, boost, buck-boost, flyback, half or full bridge, synchronous or non-synchronous circuit, etc.

Recall from FIG. A5 that a major cause for the substantial transient output voltage $V_{OUT}(t)$ dip is the power on and start up delay of the PWM modulator 10. As the start up delay varies inversely with respect to the PWM operating frequency, a dynamic frequency booster 85, coupled to the PWM oscillator 84, is added to the mode selector 74 to temporarily boost up the PWM-frequency from its otherwise normal operating frequency during the PFM-to-PWM mode transition period. As a related embodiment, the PFM-to-PWM mode transition period can be delineated with a comparison of VOUT with preset thresholds of deviation from its normal operating value.

As the start up delay varies inversely with respect to the PWM-loop response speed and the loop response speed tracks the slew rate of the error amplifier circuit 12, a dynamic slew rate booster 13, coupled to the error amplifier circuit 12, is added to the mode selector 74 to temporarily boost up the E/A slew rate from its otherwise normal operating slew rate during the PFM-to-PWM mode transition period.

As the energy stored in the capacitor 305 may be dissipated through the low-side power FET 304 to ground 308 during the startup of the PWM modulator, a dynamic turn-off logic circuit 310, coupled to the low-side power FET 304, is added to the mode selector 74 to temporarily turn off the low-side power FET 304 for a pre-determined low-side turn-off interval within the PFM-to-PWM mode transition period. In this way the output capacitor COUT 305 can only be functionally discharged through the external LOAD 306 but not unintentionally discharged through the low-side power FET 304. FIG. 3 gives an example of a more detailed block diagram illustration of the dynamic turn-off logic circuit 310. Notice the high-side driver 70 and the low-side driver 72 of FIG. 1 are collectively presented as a single block high-side+low-side drivers 73 to simplify the illustration. The dynamic turn-off logic circuit 310 has a serial connection of a dynamic turn-off timer 310a and a logic AND gate 311 driving the low-side power FET 304. The AND gate 310b has two inputs 311a, 311b respectively driven by the high-side+low-side drivers 73 and the dynamic turn-off timer 310a. Under normal operation of the dual mode modulator 50 input 311b is maintained at logic HIGH by the dynamic turn-off timer 310a with the low-side power FET 304 consequently driven logically by the high-side+low-side drivers 73 via input 311a. During the PFM-to-PWM mode transition period, however, the master control logic 52 triggers the dynamic turn-off timer 310a to temporarily pull the input 311b LOW thus keeping the low-side power FET 304 OFF regardless of the logic state of input 311a from the high-side+low-side drivers 73. In a more specific embodiment, the dynamic turn-off timer 310a can set the low-side turn-off interval within a range having a maximum about equal to the period of PWM-frequency boosting. Alternatively, the dynamic turn-off timer 310a can set the low-side turn-off interval within a range having a maximum about equal to the period of E/A slew rate boosting.

Following the embodiment of the numerous ideas of the present invention as described, FIG. 4 depicts an example comparing the dynamic load regulation between a prior art PWM-PFM dual mode modulator and the present invention dual mode modulator upon the occurrence of a large ILOAD step at time $t_0$. The normal VOUT under light load (time<$t_0$) is about 1.84 Volt. During the PFM-to-PWM mode transition period the prior art VOUT(t) 320 dips as much as 400 mV (22%) around time $t_2$ whereas the present invention VOUT(t) 340 dips by only 150 mV (8%), a substantial improvement of the dynamic load regulation. Significantly, this improvement comes about without requiring otherwise a large output capacitor COUT.

A dual mode modulator has been described that is useful as a power converter with improved dynamic load regulation. Though the invention was shown applied to a synchronous buck converter, the power converter switching regulator can be of a variety of circuit topologies such as buck, boost, buck-boost, flyback, bridge and half-bridge, synchronous and non-synchronous. It will be appreciated by those skilled in the art that the present invention can be embodied in numerous other specific forms and those of ordinary skill in the art would be able to practice such other embodiments without undue experimentation. For example, while the present invention is illustrated with a dual mode modulator, it can be expanded to a multi mode modulator with a PWM mode plus at least one non-PWM modes of operation. Examples of the non-PWM modes can include amplitude modulation, pulse phase modulation or even a pure analog mode employing an analog voltage regulator. As another example, while the present invention is illustrated with application to power converter circuits, the same inventive concept can be alternatively embodied in other types of circuits such as signal processing circuits. As a third example, while the present invention circuit is illustrated with FET transistors, the same inventive concept can be alternatively embodied in other switches such as bipolar junction transistors. The scope of the present invention, for the purpose of the present patent document, is hence not limited merely to the specific exemplary embodiments of the foregoing description, but rather is indicated by the following claims. Any and all modifications that come within the meaning and range of equivalents within the claims are intended to be considered as being embraced within the spirit and scope of the present invention.

What is claimed are:

1. A multi mode modulator for controlling a power output stage having at least one controlled transistor, the multi mode modulator comprises:
    a) a pulse width modulation (PWM) modulator operating under a PWM-frequency for controlling the power output stage under a PWM mode;
    b) at least one non-pulse width modulation (NPWM) modulators for controlling the power output stage under a mode other than the PWM mode; and
    c) a mode selector coupled to the PWM modulator and the at least one NPWM modulators for,
        c1) when it is desirable to operate under the PWM mode, powering the PWM modulator while leaving the at least one NPWM modulators in a power off state; and
        c2) when it is desirable to operate under the NPWM mode, powering the at least one NPWM modulators while leaving the PWM modulator in a power off state,
    where the mode selector further comprises a dynamic frequency booster for boosting up the PWM-frequency from its normal operating frequency during a NPWM-to-PWM mode transition period thereby shortening said mode transition period till normal PWM operation.

2. The multi mode modulator of claim 1 wherein:
    said PWM modulator comprises a PWM-feedback control loop having an error amplifier (E/A) therein with the PWM-loop response speed tracking the slew rate of the E/A; and
    said mode selector further comprises a dynamic slew rate booster for boosting up the E/A slew rate from its normal operating slew rate during the NPWM-to-PWM mode transition period thereby shortening said mode transition period till normal PWM operation.

3. The multi mode modulator of claim 2 where the power output stage has a high-side transistor serially connected to a low-side transistor at a power output node in turn connected to ground through an inductor and an output capacitor COUT for, while driven respectively by the multi mode modulator, developing an output voltage VOUT across an external LOAD and ground with a load current ILOAD flowing there through and, correspondingly:

said mode selector further comprises a dynamic turn-off logic circuit for turning off the low-side transistor for a pre-determined low-side turn-off interval within the NPWM-to-PWM mode transition period such that COUT can only be functionally discharged through the LOAD but not unintentionally discharged through the low-side transistor.

4. The multi mode modulator of claim 3 wherein said mode selector further sets the low-side turn-off interval within a range having a maximum about equal to the period of PWM-frequency boosting.

5. The multi mode modulator of claim 1 where the power output stage has a high-side transistor serially connected to a low-side transistor at a power output node in turn connected to ground through an inductor and an output capacitor COUT for, while driven respectively by the multi mode modulator, developing an output voltage VOUT across an external LOAD and ground with a load current ILOAD flowing there through and, correspondingly:

said mode selector further comprises a dynamic turn-off logic circuit for turning off the low-side transistor for a pre-determined low-side turn-off interval within the NPWM-to-PWM mode transition period such that COUT can only be functionally discharged through the LOAD but not unintentionally discharged through the low-side transistor.

6. The multi mode modulator of claim 5 wherein said mode selector further sets the low-side turn-off interval within a range having a maximum about equal to the period of PWM-frequency boosting.

7. The multi mode modulator of claim 1 wherein the NPWM is a pulse frequency mode (PFM) modulator.

8. The multi mode modulator of claim 1 wherein the NPWM is used for delivering low output power through the power output stage.

9. A multi mode modulator for controlling a power output stage having at least one controlled transistor, the multi mode modulator comprises:

a) a pulse width modulation (PWM) modulator operating under a PWM-frequency for controlling the power output stage under a PWM mode, said PWM modulator comprises a PWM-feedback control loop having an error amplifier (E/A) therein with the PWM-loop response speed tracking the slew rate of the E/A;

b) at least one non-pulse width modulation (NPWM) modulators for controlling the power output stage under a mode other than the PWM mode; and c) a mode selector coupled to the PWM modulator and the at least one NPWM modulators for, c1) when it is desirable to operate under the PWM mode, powering the PWM modulator while leaving the at least one NPWM modulators in a power off state; and c2) when it is desirable to operate under the NPWM mode, powering the at least one NPWM modulators while leaving the PWM modulator in a power off state, where the mode selector further comprises a dynamic slew rate booster for boosting up the E/A slew rate from its normal operating slew rate during the PFM-to-PWM mode transition period thereby shortening said mode transition period till normal PWM operation.

10. The multi mode modulator of claim 9 where the power output stage has a high-side transistor serially connected to a low-side transistor at a power output node in turn connected to ground through an inductor and an output capacitor COUT for, while driven respectively by the multi mode modulator, developing an output voltage VOUT across an external LOAD and ground with a load current ILOAD flowing there through and, correspondingly:

said mode selector further comprises a dynamic turn-off logic circuit for turning off the low-side transistor for a pre-determined low-side turn-off interval within the NPWM-to-PWM mode transition period such that COUT can only be functionally discharged through the LOAD but not unintentionally discharged through the low-side transistor.

11. The multi mode modulator of claim 10 wherein said mode selector further sets the low-side turn-off interval within a range having a maximum about equal to the period of E/A slew rate boosting.

12. A multi mode modulator for controlling a power output stage having a high-side transistor serially connected to a low-side transistor at a power output node in turn connected to ground through an inductor and an output capacitor COUT for, while driven respectively by the multi mode modulator, developing an output voltage VOUT across an external LOAD and ground with a load current ILOAD flowing there through, the multi mode modulator comprises:

a) a pulse width modulation (PWM) modulator operating under a PWM-frequency for controlling the power output stage under a PWM mode;

b) at least one non-pulse width modulation (NPWM) modulators for controlling the power output stage under a mode other than the PWM mode; and c) a mode selector coupled to the PWM modulator and the at least one NPWM modulators for, c1) when it is desirable to operate under the PWM mode, powering the PWM modulator while leaving the at least one NPWM modulators in a power off state; and c2) when it is desirable to operate under the NPWM mode, powering the at least one NPWM modulators while leaving the PWM modulator in a power off state, where said mode selector comprises a dynamic turn-off logic circuit for turning off the low-side transistor for a pre-determined low-side turn-off interval within the NPWM-to-PWM mode transition period such that COUT can only be functionally discharged through the LOAD but not unintentionally discharged through the low-side transistor.

13. A method for shortening a mode transition period of a multi mode modulator controlling a power output stage, the multi mode modulator has at least one switchably powerable non-pulse width modulation (NPWM) modulators for powering the power output stage under an NPWM-mode and a switchably powerable pulse width modulation (PWM) modulator with a normal operating frequency for powering the power output stage under a PWM-mode, the method comprises:

a) when it is desirable to operate under the PWM mode, powering the PWM modulator while leaving the at least one NPWM modulators in a power off state;

b) when it is desirable to operate under the NPWM mode, powering the at least one NPWM modulators while leaving the PWM modulator in a power off state; and c) when it is desirable to switch from NPWM to PWM mode, boosting up the PWM-frequency from said normal operating frequency during a following NPWM-to-PWM mode transition period thereby shortening it.

14. A method for shortening a mode transition period of a multi mode modulator controlling a power output stage, the multi mode modulator has at least one switchably powerable non-pulse width modulation (NPWM) modulators for powering the power output stage under an NPWM-mode and a switchably powerable pulse width modulation (PWM) modulator for powering the power output stage under a PWM-mode, the PWM modulator has a PWM-feedback control loop having an error amplifier (E/A) therein with the PWM-loop response speed tracking the slew rate of the E/A, the method comprises:

a) when it is desirable to operate under the PWM mode, powering the PWM modulator while leaving the at least one NPWM modulators in a power off state;

b) when it is desirable to operate under the NPWM mode, powering the at least one NPWM modulators while leaving the PWM modulator in a power off state; and c) when it is desirable to switch from NPWM to PWM mode, boosting up the E/A slew rate from its normal operating slew rate during a following NPWM-to-PWM mode transition period thereby shortening it.

15. A method for improving load regulation during a mode transition period of a multi mode modulator controlling a power output stage having a high-side transistor serially connected to a low-side transistor at a power output node in turn connected to ground through an output capacitor COUT for, while driven respectively by the multi mode modulator, developing an output voltage VOUT across an external LOAD and ground with a load current ILOAD flowing there through, the multi mode modulator has at least one switchably powerable non-pulse width modulation (NPWM) modulators for powering the power output stage under an NPWM-mode and a switchably powerable pulse width modulation (PWM) modulator for powering the power output stage under a PWM-mode, the method comprises:

a) when it is desirable to operate under the PWM mode, powering the PWM modulator while leaving the at least one NPWM modulators in a power off state;

b) when it is desirable to operate under the NPWM mode, powering the at least one NPWM modulators while leaving the PWM modulator in a power off state; and c) when it is desirable to switch from NPWM to PWM mode, turning off the low-side transistor during a following PFM-to-PWM mode transition period such that COUT can only be functionally discharged through the LOAD but not unintentionally discharged through the low-side transistor thereby improving load regulation.

* * * * *